United States Patent

[11] 3,529,572

| [72] | Inventor | Glenn R. Rose |
| --- | --- | --- |
| | | St. Paul, Minnesota |
| [21] | Appl. No. | 750,988 |
| [22] | Filed | Aug. 7, 1968 |
| [45] | Patented | Sept. 22, 1970 |
| [73] | Assignee | Programmed & Remote Systems Corporation |
| | | St. Paul, Minnesota |
| | | a corporation of Minnesota |

[54] PNEUMATIC PAINTING PROGRAMMER
11 Claims, 4 Drawing Figs.

[52] U.S. Cl. .................................................. 118/7,
118/323
[51] Int. Cl. ..................................................... B05c 11/00
[50] Field of Search .......................................... 118/2, 6, 7,
8, 323, 324; 15/(Inquired); 134/(Inquired)

[56] References Cited
UNITED STATES PATENTS

| 2,754,795 | 7/1956 | Enssle .......................... | 118/8X |
| --- | --- | --- | --- |
| 3,029,774 | 4/1962 | Namenyi-Katz .............. | 118/2 |

*Primary Examiner* — John P. McIntosh
*Attorney* — Dugger, Peterson, Johnson and Westman

ABSTRACT: A pneumatic painting programmer for automatically programming the spray painting of automobile sides utilizing in combination switching arrangements which give a grid type control circuit layout and which can be connected in a manner to insure that the paint spray head is turned on and turned off at the proper times to paint an automobile. By having the circuit energized at the proper point in the grid, the points of energization are determined by placing a scale drawing of the automobile over a scale layout of the electrical circuit and then making the indicated connections on the grid circuit.

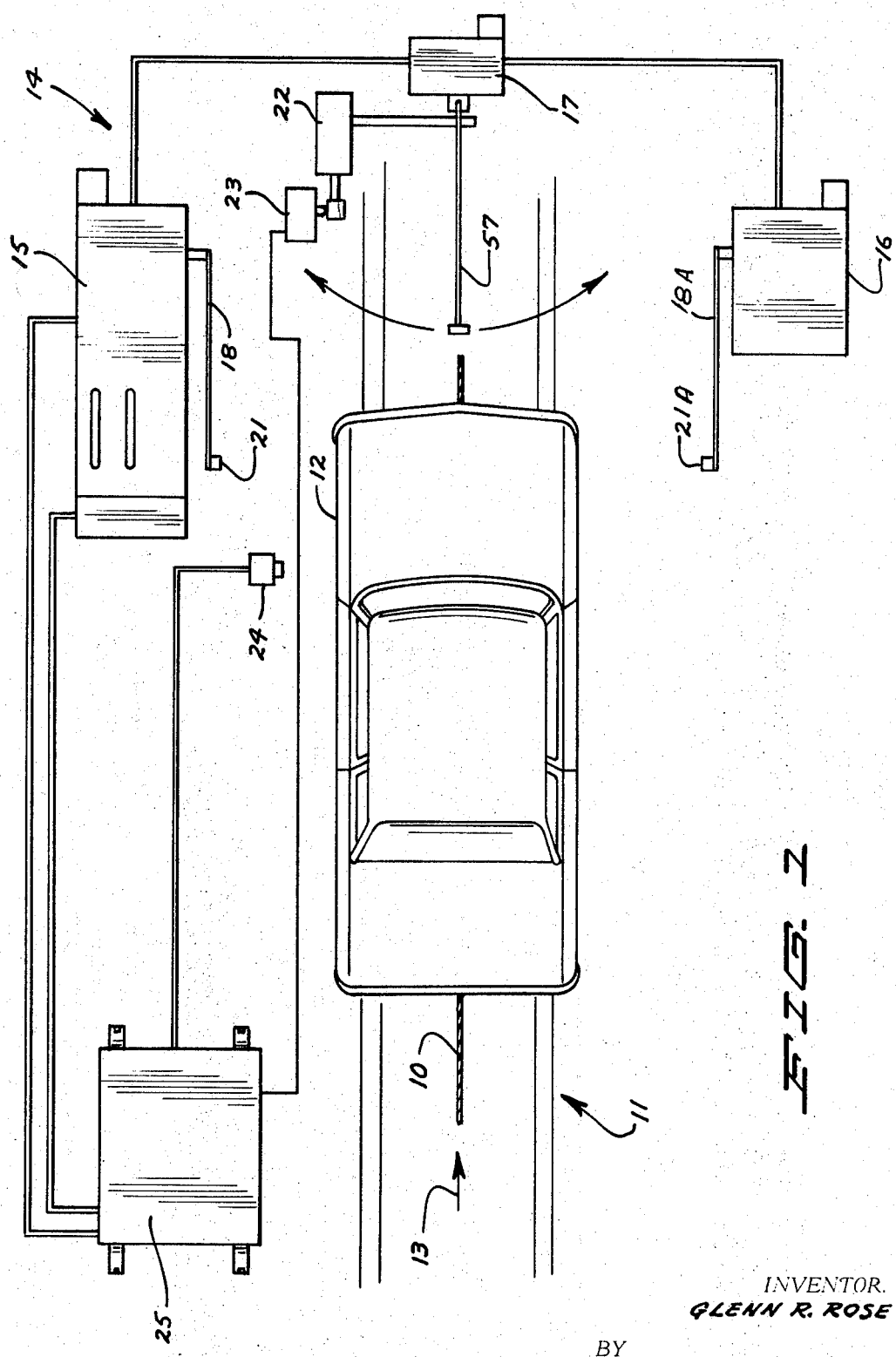

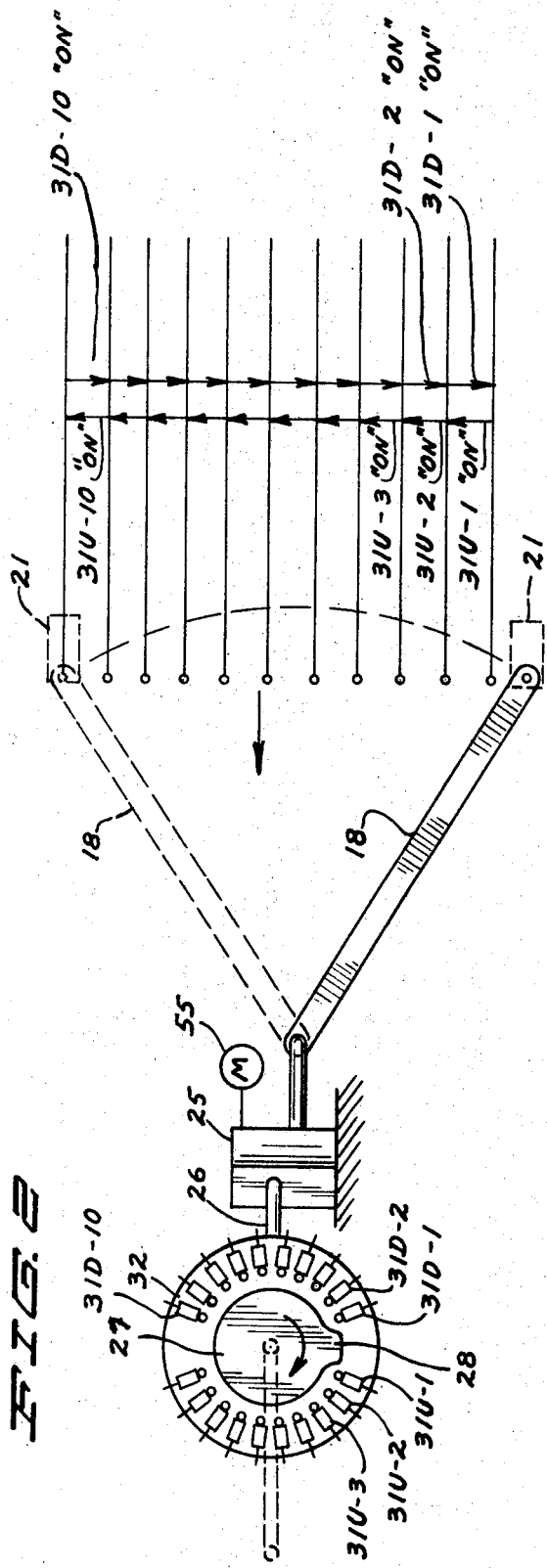
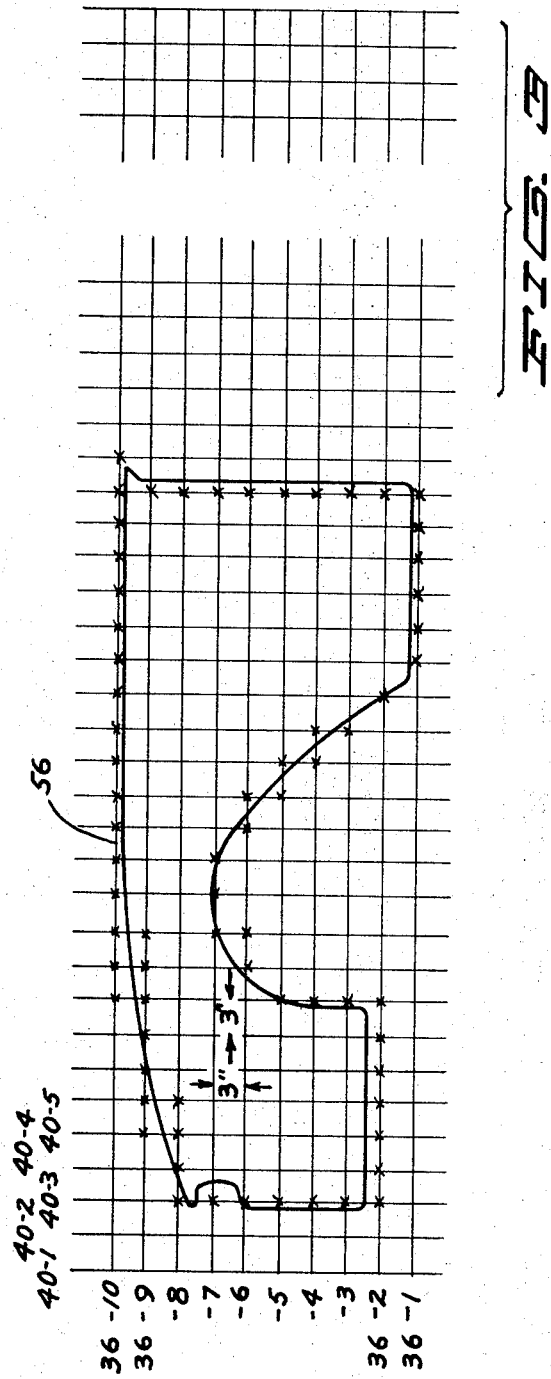
INVENTOR.
GLENN R. ROSE

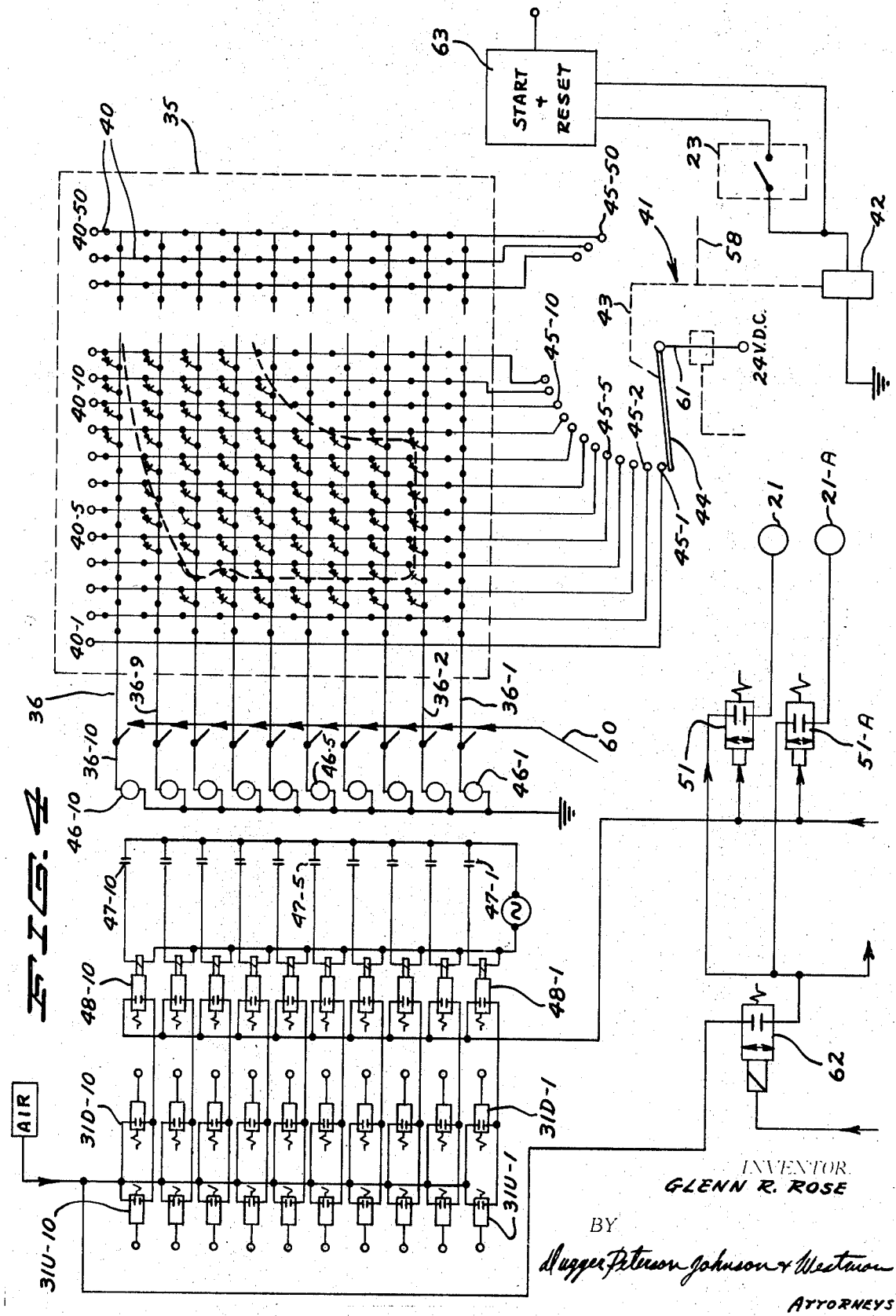

3,529,572

PNEUMATIC PAINTING PROGRAMMER

BACKGROUND OF THE INVENTION

1. Field of the Invention

The present invention relates to devices for programming spray painting of automobiles and other objects for automatic operation.

2. Prior Art

Automatic spray painting of automobiles has been programmed in various ways including photo electric cells operating on a drum system. Usually these programmers operate in combination with painters which have a definite path of travel, and the automobile is moved by the painter on a conveyor line. In this way the spray head carried by the painter defines a definite path on the automobile each time it cycles.

A problem in automatic controls is to get accuracy (not to overlap spray excessively) and to shut off the spray gun in areas of cut-outs, such as wheel or window cut-outs in order to minimize the wasting of paint. Of course, a complete painting job of the automobile has to be insured.

SUMMARY OF THE INVENTION

The present device relates to a programming system utilizing automatic control for a dispensing or spray head or other work performing device. The device programs two coordinates, for example, the horizontal movement of an object (automobile) relative to a vertically moving spray painting head. The two movements are in different paths, as shown at right angles to each other. These two movements can be graphically represented by breaking down the travel distance in each path into known segments and drawing a grid which then represents the relative movements. It also represents the generated area of coverage of the dispensing head on an object moving past the dispensing head. A control board is also utilized which has a plurality of parallel conductive paths extending in a direction corresponding to the direction of movement of the object, and spaced apart in direction corresponding to the direction of movement of the dispensing head, and a plurality of overlying conductive paths extending in direction corresponding to the direction of movement of the dispensing head, and spaced apart in direction corresponding to the direction of movement of the object. This forms a grid corresponding to for the dispensed material. These conductive paths can be interconnected with shorting plugs at their overlying intersections. The connections are used to control the valve of the dispensing head so that the head will only dispense or paint when the proper circuits are energized through the connection plugs. Switches are used to indicate the relative position of the dispensing head in vertical direction and the object in horizontal direction. When the two position indication signals are both connected through the control board, the dispensing head will dispense. By using a scale layout corresponding to the configuration of the surface of the object to be painted, and overlaying this onto a similar scale grid pattern representing the generated dispensing pattern, the shorting plugs can be properly inserted in the control board to turn on the dispensing head only when a part or portion of the object to be coated or painted is properly positioned.

The program can be changed when a particular run is finished, or different boards can be left programmed correctly and merely interconnected so that the program is not changed on the board, and the next time this particular model or object is to be painted or coated, the program board can be reused.

BRIEF DESCRIPTION OF THE DRAWINGS

FIG. 1 is a schematic top plan representation of a typical conveyor line painting assembly utilizing a programming device made according to the present invention;

FIG. 2 is a schematic representation of an arm carrying a spray painting head used with the device of the present invention;

FIG. 3 is a schematic representation of a typical layout for programming the painting of a fender of an automobile with the device of the present invention; and FIG. 4 is a schematic representation of typical electrical circuitry used in control painting a fender as shown in FIG. 3.

DESCRIPTION OF THE PREFERRED EMBODIMENT

A conveyor cable 10 for a conveyor assembly 11 has an automobile 12 mounted thereon for movement as indicated by arrows 13. The conventional conveyor assembly 11 is utilized for carrying automobiles 12 past a spray painting station illustrated generally at 14. The station includes a reciprocating arm type master painter unit 15, and a slave painter unit 16 which operates in the same manner as the master unit but on the opposite side of the automobile from the master unit. A top painter 17 for painting the top surface of an automobile may also be used and driven by the master unit. The master and slave painter units 15 and 16 are used for painting the side surfaces of the automobile.

The type of painter utilized is that shown in the copending U.S. Pat. application of Glenn R. Rose et al., Ser. No. 561,882, filed June 30, 1966 for Spray Painter now abandoned. The showing of the painter mechanisms here will be schematic, but the operational components are shown in detail in that application.

The top painter can also use this type of arm as shown in said application.

The painters 15 and 16 each have an arm 18 and 18A, respectively which reciprocate about an axis through use of a suitable drive mechanism. The outer end of the arms 18 and 18A each carry a paint spray gun 21 and 21A. The spray gun can be of the type shown in the copending U.S. Pat. application of Robert F. Hedin, Ser. No. 586,102, filed Oct. 12, 1966 for Spray Head now U.S. Pat. No. 3,443,578. The spray guns 21 are controlled with pneumatic controls as will be shown schematically, and have separate controls so that the paint spray from the guns can be shut off and turned on at predetermined signals.

The conveyor assembly 11 has a drive means shown schematically at 22 of the usual type. The drive in turn has a signal switch 23 which, as shown, will give an electrical pulse or indication for each three inches of travel of the conveyor cable 10. As shown, a micro switch 23 is positioned so it will be closed by a cam driven by a shaft coming from the conveyor drive 22. The gear box is selected so the cam closes the micro switch to give a signal every time the conveyor has traveled three inches. The necessity for a signal every three inches of conveyor travel will be apparent as the description proceeds. In addition to the conveyor travel signal shown, which is merely illustrative of the many types that could be used, for example a photo cell, a start signal device 24 is also utilized. This will normally be a photo electric cell which will sense the presence of a car 12 in starting relation to the spray painting area 14, and after suitable time delay, if necessary, will initiate the painting program.

In the application showing the spray painter, Ser. No. 561,882, the painting is programmed with a rotary drum 151 for turning off and on the spray painting head. In the present device, this drum is replaced with a mechanism which is mounted in a housing 25 that houses the controls for the master painter unit 15 and slave painter unit 16 as well as the top unit 17.

Referring to FIG. 2, as shown schematically, the painting arm 18 for the master unit carries spray gun 21. The drive 25 for the painting arm 18 is shown schematically in this instance and all movements and actions are duplicated in slave painter 16. The path of movement of the spray gun about the arm axis is shown as the arm moves from the lower home position to an upper dotted position and back. The arm oscillates back and forth between positions. The travel between these two positions is divided off into 10 equal bands. In practice, each of these bands is three inches wide. The arm drive 25 has an output shaft 26 which rotates continuously in synchronism with the oscillatory movement of the arm 18 as it goes from top to bottom and back. The shaft 26 drives a cam 27. The cam 27 has a lobe 28 which is positioned to engage the actuating elements of a plurality of air pilot switches 31. The pilot switches are arranged onto a mounting member 32 and positioned so that the lobe 28 will sequentially engage the actuating elements of the switches as the shaft 26 rotates. As shown, there are 10 pilot switches 31U standing for switches which are contacted on the upstroke of the arm 18, and 10 pilot switches 31D which are pilot switches that are contacted on the downstroke of the arm 18. For convenience, the pilot switches are labeled 31D−1 through 31D−10 and 31U−1 through 31U—10. The shaft 26 makes a full revolution for a complete up and down stroke of the arm 18.

The lobe 28 of the cam is wide enough so that it will span two of the adjacent air pilot switches 31D or 31U as it moves so that there is a continuous connection for energizing the spray gun (the switches 31 are used for this purpose).

These switches are commercially available units which, when closed, pass air therethrough from a source to a remote connection.

Thus it can be seen that a vertical height of 30 inches is traveled by the spraying heads and this has been divided into 10 strips. The spraying of paint during travel across each of these strips during the upstroke is controlled by air pilot switches 31U and on the downstroke by the air pilot switches 31D. These take care of the vertical control during programming of the spray paint head. The vertical signals are used in combination with the signal from the conveyor which ties in the horizontal position of an automobile in relation to the spray head.

The programming apparatus includes a plug board 35 which is shown schematically in FIG. 4. The plug board 35 is a board sold under the trademark sealectoboard by the Sealectro Corporation of Mamaroneck, New York. This type of board is shown in U.S. Pat. No. 3,145,329.

The board includes contact strips or busses 36 which run in coordinates corresponding to the horizontal lines shown in FIG. 2 and which are spaced apart to the vertical movement of the spray paint head into 10 segments or bands. As shown, there are 10 such strips 36.

In addition, there are continuous contact strips or busses 40 running at right angles to the strips 36 and in a different plane so that the strips 36 and 40 do not actually intersect, but overlie each other. The strips 40 are spaced apart and represent divisions of the movement of the conveyor into segments. As shown, the board utilizes 50 such strips 40. The overlying strips 36 and 40 can be interconnected at coordinate intersections using suitable connecting pins or component holders 50, which have a diode in circuit that is electrically connected between the two strips when the holder or pin 50 is in place. The term coordinate intersection is used in the sense of imaginary line intersections. The strips 36 and 40 do not actually intersect, but are in different planes. The strips overlie and form coordinate intersections. The strips can be electrically connected at the coordinate intersections with connecting pins or component holders 50.

The strips 40 are used for indicating the horizontal position of an automobile on the conveyor relative to the spray painting head 21. In order to do this, the switch 23 is connected into the controls of a stepping switch assembly 41 which is of conventional design, and which will "step" or change one position each time the electrical signal comes from the switch 23. This indicates that the automobile has moved an additional 3 inches of travel along the conveyor. The stepping switch includes a relay coil 42 which is energized each time the switch 23 is closed. The relay 42 operates through a link 43 to a switch arm 44 which contacts one of a plurality of contact members 45. Each of the contact members 45 is connected to a separate one of the strips 40. For convenience the strips 40 are numbered 40—1 through 40—50, and the contacts are numbered 45—1 through 45—50.

As shown schematically, connecting pins 50 at certain coordinate intersections electrically connect the strips 40 to the associated strips 36. Thus, when the stepping switch is moved to a particular contact 45 connected with a particular strip 40, there will be connection from that strip 40 to associated strips 36 underlying that strip 40 at each coordinate intersection where a pin is located. Each of the strips 36−1 through 36−10 is electrically connected to a separate relay coil 46 that control sets of contacts 47—1 through 47—10, respectively. Each set of contacts 47 controls a circuit through one of a plurality of solenoid valves 48—1 through 48—10, respectively. The valves 48 in turn control the flow of air from the cam operated air pilot switches 31U or 31D to air pilot operated spray gun valve 51 and 51A, which control the spray guns 21 and 21A. When the air is passed through one of the valves 48 to the valves 51 and 51A, the valves 51 and 51A open and air is then introduced from the source 49 to the spray guns or heads 21 themselves. As shown, 21 is the gun on the master side, and 21A is the gun of the slave side.

Thus, it can be seen that the stepping switch acts as an arming device by activating certain of the solenoid valves 48, and in order for the spray guns 21 to be activated, a particular switch 31 has to be operated indicating that the arm 18 (and the arm for the other side as well) is in a particular position. This will establish the spray gun position in relation to a particular strip 36. The automobile positions are indicated by speed control 23 and by the control arm 44 of the stepping switch to show that the automobile to be painted is in a particular position corresponding to a particular strip 40 on the plug board 35. Connecting pins 50 are placed to connect the proper strips 36 with that particular strip 40 (which is connected to power) in order to energize the associated relay coil 46, closing the associated contact 47, energizing the associated solenoid 48. When the associated air pilot switch 31 is closed, the gun is operated for a 3—inch wide band of vertical travel. As soon as the arm 18 is moved on to the next switch (the cam has contacted another switch in series) whether or not the spray guns 21 and 21A are operated depends upon the placement of a connecting pin 50 at the coordinate junction for the next strip 36 and the strip 40 that is currently energized.

It should be noted that the lobe 28 of the cam for the air switches 31 is wide to span more than one switch so that before the valve 31U−1 is opened, the valve 31U−2 is closed. This, of course, is on the upstroke. On the downstroke, the D valves would be operated in the same manner.

The arm 18 is shown in solid lines in a home position, as is the arm 44 for the stepping switch. When the start signal is initiated by the presence of an automobile, after a suitable time delay if desired, the arm 18 will be started through the operation of its motor 55, and the stepping switch arm 44 will be moved to the first contact 45−1. Then, as the arm 18 moves in its up and down cycle, the various air pilot switches 31 will be actuated in sequence, as described, and each time one of them is actuated it represents a movement of 3 inches vertically of the arm 18 (and the corresponding arm on the slave side). Likewise, each time the switch 23 is closed it represents a movement of 3 inches horizontally of the automobile. The points at which the pins 50 are inserted in the control board to make connections determines when and where the spray guns 21 will be turned on. The spray fans from the guns are wide enough to permit the use of 3—inch wide segments without skips and without excessive overlap.

In order to determine the proper position of the pins 50 schematically, a grid system shown in FIG. 3 can be layed out. The horizontal lines correspond to the strips 36 and the vertical lines correspond to the strips 40. An outline of a fender, for example, to be painted is illustrated at 56, and can be laid out to scale. Each of the areas defined between the intersections of the grid lines shown in FIG. 3 would represent the 3 inches horizontal and 3 inches vertical actual travel of the spray head. Then a scale model of the fender is laid in place, and all of the intersection points within this scale model would correspond to points that should be connected on the plug board 35. The points that are marked X and lying outside the periphery of the fender are made to insure adequate coverage of the unit, and still the large cut-out areas, such as for the fender or for the wheel, are not painted and a great saving of paint is made.

To show this effect, the front portion of a fender shown in FIG. 3 is also outlined in dotted lines in FIG. 4 within the plug board area 35.

In the top machine, the arm 57 used also drives a cam operating the air pilot switches, and a control line 58 can run to another stepping switch used with the top machine, just as that is used with the side machines. Separate programming boards would be used for programming the spray pattern on the top of the vehicle. For different programs, tie-in lines illustrated at 60 can be utilized for tying in other program boards to the same relay coils 46. In this instance, different plug boards 35 would be utilized and the line 61 leading from the power source to arm 44 would be opened with suitable relay contacts, and a line to a separate stepping switch would be closed. The separate stepping switch would control another board 35 having a different program on it for a different fender.

If desired, an air cut-out valve 62 can be utilized for interrupting the air supply to the valves 51A and 51B in case of conveyor stoppage, for example. This valve 62 is utilized so that if the conveyor stops there will be no more painting. The unit would have to be reset before it could be reused. Suitable resetting and starting switches 63 can be utilized with the unit for resetting the painter arm to its home position and the stepping switch to its home position.

OPERATION

To follow through sequence of operation of the device, as shown with the programming on the board 35, the painter arm 18 is in its home position and the stepping switch is also in its home position. The arm and stepping switch are moved to these home positions by the reset circuits after completion of a program or by a manual button. Then, once the start signal 24 has been given, a program will be initiated. There can be a time delay between the signal 24 and the start of the program. The time delay can be of any length desired, but has to be sufficient so that from the time the control 24 is energized until the front portion of the automobile or object to be painted comes into positon adjacent the spray guns 21 and 21A, there will be no operation of the program.

Motor 55 for the arms 18 can be cycled prior to the time the spray guns are turned on, in order to get the program started. Assuming that the arm 18 starts the cycle upwardly when the first signal from switch 23 is given, this will connect the stepping switch to contact 45—1 to energize the bus or contact strip 40—1. As can be seen, the switches 31U will be contacted on the upstroke of arms 18 and 18A, but there are no connecting pins 50 in any of the coordinate intersections between 40—1 and the strips 36. Thus the spray heads or guns will not be energized.

Then, as the conveyor travels 3 more inches, the spray gun will be partially through its upstroke. The second signal from switch 23 after the conveyor has traveled 3 inches will connect the stepping switch and circuitry through strip 40—2. The spray guns still will not operate because there are no connecting pins between the strip 40—2 or any of the strips 36. The arm 18 will reach the top of its upward stroke after the conveyor has traveled another 3 inches. A third signal will come from switch 23 and will advance the stepping switch to contact 45—3 and connect the strip 40—3 to power. The arms 18 and 18A will be on the down stroke. The cam 27 rotates and will contact switches 31D—10, 31D—9 and then will contact 31D—8. This will close the air pilot switch 31D—8 so that the air from source 49 will flow to the pilot solenoid valve 48—8.

As soon as the stepping switch is moved to connect the strip 40—3 to power (24 volt D.C. power source is used), all of the control relays which are connected to the strip 40—3 through the various lines 36 will be energized. For example, as shown, there are shorting pins in the coordinate intersections between the strips 40—3 and the strips 36—2 through 36—8. This means that the relay coil 46—2 through 46—8 will be energized. This will close the relay contacts 47—2 through 47—8 and energize the solenoid valves 48—2 through 48—8. Thus, it can be seen that as soon as the cam contacts the air pilot switch 31D—8, pilot air will be passed from the source through the switch 31D—8 and through the solenoid valve 48—8 to operate the pilots of spray gun valves 51A and 51B. The spray gun valves will direct air from the source 49 to the guns 21A and 21B, and spray painting will be commenced. Thus as the arms move downward, each of the subsequent air pilot switches 31D will be actuated in a like manner and the spray gun will be continuously operated during the appropriate positions of its stroke. This is one of the reasons why the cam lobe 28 spans more than one of the pilot switches as it moves.

After the conveyor has again traveled 3 inches, (about halfway through the downstroke of arms 18 and 18A) the stepping switch will be moved one more time upon receiving the signal from the micro switch 23 and this will direct power to the strip 40—4. This will energize the strips 36 which are connected with the pins 50 to this strip 40—4. In this same instance, the relay coils 46—2 through 46—8 will be energized closing the contacts 47—2 through 47—8 and opening the air pilot solenoid valves 48—2 through 48—8. (They permit air passage.)

The sequence of painting will continue as the conveyor moves along, and each of the strips 40 will be energized sequentially as the conveyor moves.

The board 35 shown has 10 strips 36 for the vertical coordinates, and 50 strips 40 for horizontal coordinates, permitting programming of a length of 150 inches for spraying. Of course, the boards can be expanded if necessary.

Thus, by using a grid system, and a scale model mark up, and then using interconnecting plug boards the spray painting can be easily programmed to suit the existing conditions and can be changed to meet different conditions very readily.

The operation is explained in connection with the side painters, but the same type of programming can be used for the top painter. Also, the complete automobile can be programmed for painting at once. The unit has resetting circuits to reset the stepping switch when each program is completed. When a different automobile comes along and activates start signal device 24, the program will repeat.

The diodes in connecting pins 50 are used to block reverse flow of current, thus preventing unwanted feedback of current to strips 40 which are not supposed to be energized.

I claim:

1. A device for programming the performance of an operation on a remote object, including first means for performing said operation on said remote object, said first means being movable generally in a first plane and having actuable means to perform said operation, means to move said object generally along a second plane past the first means, control means for said operation including second means for giving a signal at predetermined intervals of movement of said first means to indicate successive positions of said first means in said first plane, third means to give a signal to indicate successive positions of said object in said second plane relative to said first means, correlation means to interconnect said second and third means to give a combination signal when the first means and said object are at predetermined positions, and means to intiate said actuable means in response to said combination signal.

2. The combination as specified in claim 1 wherein said first means moves in said first plane in reciprocal movement, and wherein said second means gives signal sequentially in both directions of movement of said first means, and wherein said third means gives signals sequentially as said object moves past said operation performing means.

3. The combination as specified in claim 2 wherein said correlation means includes first electrically conductive members, means to sequentially connect said first electrically conductive members to power in response to signals from the third means, second electrically conductive members, means to selectively electrically connect said second electrically conductive members to provide a continuous path for power, said means to initiate said actuating means including devices having two signal input means, one signal input means being actuated by power received from said second electrically conductive members and the other signal input means being actuated by signals from said second means, there being separate devices and separate second electrically conductive members for each predetermined position of said first means.

4. A device for programming the coating of an object with a dispensed coating, including a reciprocating dispensing head, said dispensing head being movable in a definite path of operation and reciprocating across this path, means to move the object to be coated adjacent the path of movement of said dispensing head so that coating material is applied to said object as it moves past when said dispensing head is operating, means to reciprocate said dispensing head in its path of movement, means to control dispensing of material from said dispensing head, first means associated with said dispensing head giving sequential signals each indicating a separate position of said head in its path of movement, second means associated with said means to move the object to sequentially indicate separate positions of said object as it moves adjacent to said head, and correlation means receiving signals from said first means and from said second means, and including signal connection means to initiate said dispensing to dispense material when said dispensing head and said object are at preselected positions relative to each other.

5. The combination as specified in claim 4 wherein said means to control dispensing of material from said head includes a plurality of sets of controls, said sets of controls each including first and second separate elements both of which must be activated before said dispensing head operates, there being separate sets of controls corresponding to each of the indicated separate positions of the head throughout its path of travel, a control board, said control board having a plurality of first signal carriers, a separate one of said first signal carriers being connected to the first elements in each of the sets of controls, a plurality of second signal carriers, a power source, means to connect said second signal carriers sequentially to said power source upon receipt of the sequential indications of object positions from the second means, signal carrier means interconnecting each of said second signal carriers with selected ones of first signal carriers, said first elements being actuated when connected to power so that when each second signal carrier is connected to power a preselected number of first elements are also connected to power, said first means delivering a signal to actuate the second element of each set of controls sequentially as the dispensing head moves in its predetermined path to thereby actuate said dispensing head at points of the path of travel of the dispensing head wherein both the first and second elements of said control means for said head are actuated.

6. The combination as specified in claim 5 wherein said first elements are actuated in response to receipt of electrical power, and wherein said first and second signal carriers are electrically conductive members, and wherein said signal carrier means comprise components electrically connecting predetermined ones of said first and second signal carriers.

7. The device of claim 4 wherein means are provided to actuate the first means so that a subsequent signal is given before the previous signal is discontinued.

8. The device of claim 4 wherein the first means comprise switch means, said switch means having actuators, and a cam member moving in relation to the movement of the dispensing head, said cam member sequentially contacting said switch means as the dispensing head moves in its path of travel.

9. The device of claim 6 wherein the object is mounted on conveyor means, means to drive said conveyor means in a path of travel to move the object adjacent to the dispensing head, said second means delivering a signal every time the conveyor has traveled a predetermined distance.

10. The device of claim 9 and stepping switch means, said stepping switch having a plurality of terminals, each connected to one of the second signal carriers, connection means to sequentially connect each of the terminals to the source of power, said connection means advancing to the next terminal each time a signal is received from the second means.

11. The device of claim 6 wherein said first electrically conductive members lie generally along a first plane, and said second electrically conductive members lie generally in a second plane spaced from and overlying the first members, said first and second members forming coordinate intersections, and means to electrically connect said first and second members at preselected coordinate intersections.